(12) United States Patent
Broicher et al.

(10) Patent No.: US 12,203,509 B2
(45) Date of Patent: Jan. 21, 2025

(54) ROTARY POWER TRANSMISSION DEVICE WITH CLUTCH

(71) Applicant: GKN Automotive Limited, Birmingham (GB)

(72) Inventors: Simon Broicher, Hürth (DE); Waldemar Rupp, Hürth (DE); Jan Haupt, Kürten (DE); Marc Absenger, Wuppertal (DE)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/235,400

(22) Filed: Aug. 18, 2023

(65) Prior Publication Data
US 2024/0084860 A1    Mar. 14, 2024

Related U.S. Application Data

(60) Provisional application No. 63/405,314, filed on Sep. 9, 2022.

(51) Int. Cl.
*F16D 11/14* (2006.01)
*F16D 28/00* (2006.01)

(52) U.S. Cl.
CPC .............. *F16D 28/00* (2013.01); *F16D 11/14* (2013.01)

(58) Field of Classification Search
CPC ........................... F16D 2023/123; F16D 11/14
See application file for complete search history.

(56) References Cited

U.S. PATENT DOCUMENTS

| | | | |
|---|---|---|---|
| 6,959,799 B2 | 11/2005 | Fusegi et al. | |
| 8,234,955 B2 | 8/2012 | Palazzolo et al. | |
| 9,616,746 B2 | 4/2017 | Peura et al. | |
| 2017/0167544 A1* | 6/2017 | Beesley | F16H 25/20 |
| 2017/0198757 A1* | 7/2017 | Colber, Jr. | F16D 11/14 |
| 2018/0372168 A1* | 12/2018 | Beigang | F16D 23/12 |
| 2021/0033184 A1* | 2/2021 | Lundstrom | F16D 28/00 |
| 2023/0234535 A1* | 7/2023 | Yulish | F16D 28/00 |
| | | | 192/41 R |

* cited by examiner

*Primary Examiner* — Stacey A Fluhart
(74) *Attorney, Agent, or Firm* — Reising Ethington P.C.

(57) ABSTRACT

An actuator and clutch assembly for a power transmission device includes a first and second clutch members arranged to selectively define a connected state of the clutch when the second clutch member is drivingly engaged with the first clutch member and a disconnected state of the clutch when the second clutch member is not drivingly engaged with the first clutch member. An electric motor drives an input member driven for rotation about an axis, and an output member is driven axially relative to the input member when the input member rotates, wherein the second clutch member moves axially with the output member. A spring provides a force on the output member that biases the output member in a direction in which the second clutch member is moved toward the first clutch member. The spring is radially and axially overlapped by the input member and the output member.

18 Claims, 6 Drawing Sheets

ROTARY POWER TRANSMISSION DEVICE WITH CLUTCH

REFERENCE TO RELATED APPLICATIONS

This application claims the benefit of U.S. Provisional Application Ser. No. 63/405,314 filed on Sep. 9, 2022 the entire content of which is incorporated herein by reference in its entirety.

TECHNICAL FIELD

The present disclosure relates generally to an actuator for a clutch of a rotary power transmission device.

BACKGROUND

In general, vehicle drivelines transmit torque from a vehicle's engine to its wheels. Automotive drivelines sometimes include a drive unit for selectively distributing torque to the wheels. A drive unit typically consists of a housing that encloses and supports gears, shafts, and bearings. Shifting may occur between engagement of various components (e.g., gears, shafts, etc.) to selectively modify the torque distributed in the drive unit. Drive units incorporating or connected to a differential may be able to selectively lock and unlock gears in the differential.

SUMMARY

In at least some implementations, an actuator and clutch assembly for a power transmission device includes a first clutch member and a second clutch member movable relative to and selectively drivingly engageable with the first clutch member to define a connected state of the clutch when the second clutch member is drivingly engaged with the first clutch member and a disconnected state of the clutch when the second clutch member is not drivingly engaged with the first clutch member. An electric motor drives an input member driven for rotation about an axis, and an output member is driven axially relative to the input member when the input member rotates, wherein the second clutch member moves axially with the output member. A spring provides a force on the output member that biases the output member in a direction in which the second clutch member is moved toward the first clutch member. The spring is radially and axially overlapped by the input member and the output member.

In at least some implementations, an actuator sleeve is engaged by the spring and biased into engagement with the output member, the actuator sleeve being coupled to the second clutch member so that the actuator sleeve and second clutch member move together and not relative to each other. In at least some implementations, the actuator sleeve radially and axially overlaps at least part of the spring, and the input member and output member radially and axially overlap at least part of the sleeve. In at least some implementations, the input member includes a radially outer surface, an intermediate surface that is radially inward of the radially outer surface, and a radially inner surface that is radially inward of the intermediate surface, and wherein at least part of the actuator sleeve is received radially inward of the radially inner surface.

In at least some implementations, the actuator sleeve is coupled to the second clutch member by one or more fingers received in slots formed in the second clutch member, where the one or more fingers and slots are oriented radially. In at least some implementations, the actuator sleeve includes a radially extending rim at a location spaced from the second clutch member, and the output member is located between the input member and the rim. In at least some implementations, the spring provides a force on the actuator sleeve, and movement of the output member in one axial direction moves the sleeve against the force of the spring. In at least some implementations, the input member is annular, the output member is annular and the actuator sleeve extends through the input member and the output member.

In at least some implementations, the output member includes a cam surface that is inclined relative to the axis and is engaged by the input member so that the output member is driven axially during rotation of the input member. In at least some implementations, the output member includes a non-driving surface at a circumferential end of the cam surface, where the non-driving surface is defined by one or both of a detent or a flat surface that is perpendicular to the axis and is arranged to retain an axial position of the output member.

In at least some implementations, the output member includes multiple cam surfaces that are circumferentially spaced apart and are inclined relative to the axis, the cam surfaces are engaged by the input member so that the output member is driven axially during rotation of the input member, and the output member includes multiple non-driving surfaces between adjacent ones of the cam surfaces, with the non-driving surfaces arranged to retain an axial position of the output member.

In at least some implementations, the input member includes gear teeth provided on a radially outer surface of the input member, the motor rotates a gear that is meshed with the gear teeth, and the spring is located radially inward of the input member. In at least some implementations, the output member includes a cam surface that is inclined relative to the axis and is engaged by the input member so that the output member is driven axially during rotation of the input member, and wherein the cam surface is located radially inwardly of the gear teeth.

In at least some implementations, a rotary power transmission device, includes a housing having a tubular portion with a central axis, a clutch carried by the housing and having a first clutch member and a second clutch member that is movable relative to and selectively engageable with the first clutch member, an electric motor, an input member driven for rotation about the central axis by the motor, the input member being located radially outwardly of the tubular portion, an output member driven axially relative to the input member when the input member rotate, an actuator sleeve and a spring. The actuator sleeve is coupled to the second clutch member, has an intermediate portion received radially between the tubular portion and the input member, and has a radially extending rim that radially overlaps the output member. The spring is received at least partially between the actuator sleeve and the tubular portion, the spring providing a force on the actuator sleeve that biases both the sleeve and the output member in a first axial direction.

In at least some implementations, the first axial direction is a direction in which the second clutch member is engaged with the first clutch member, and wherein the electric motor rotates the input member in a first direction to axially drive the output member and sleeve in a second axial direction that is opposite to the first axial direction.

In at least some implementations, the output member includes multiple cam surfaces that are circumferentially spaced apart and are inclined relative to the axis, the cam surfaces are engaged by the input member so that the output member is driven axially during rotation of the input member, and wherein the output member includes multiple non-driving surfaces between adjacent ones of the cam surfaces, with the non-driving surfaces arranged to retain an axial position of the output member.

In at least some implementations, the output member is located axially between the rim and the input member.

In at least some implementations, a bearing is carried by the tubular portion and a first end of the spring engages the bearing and a second end of the spring engages the actuator sleeve.

BRIEF DESCRIPTION OF THE DRAWINGS

The following detailed description of preferred embodiments and best mode will be set forth with reference to the accompanying drawings, in which.

DETAILED DESCRIPTION

Figures 1, 2:
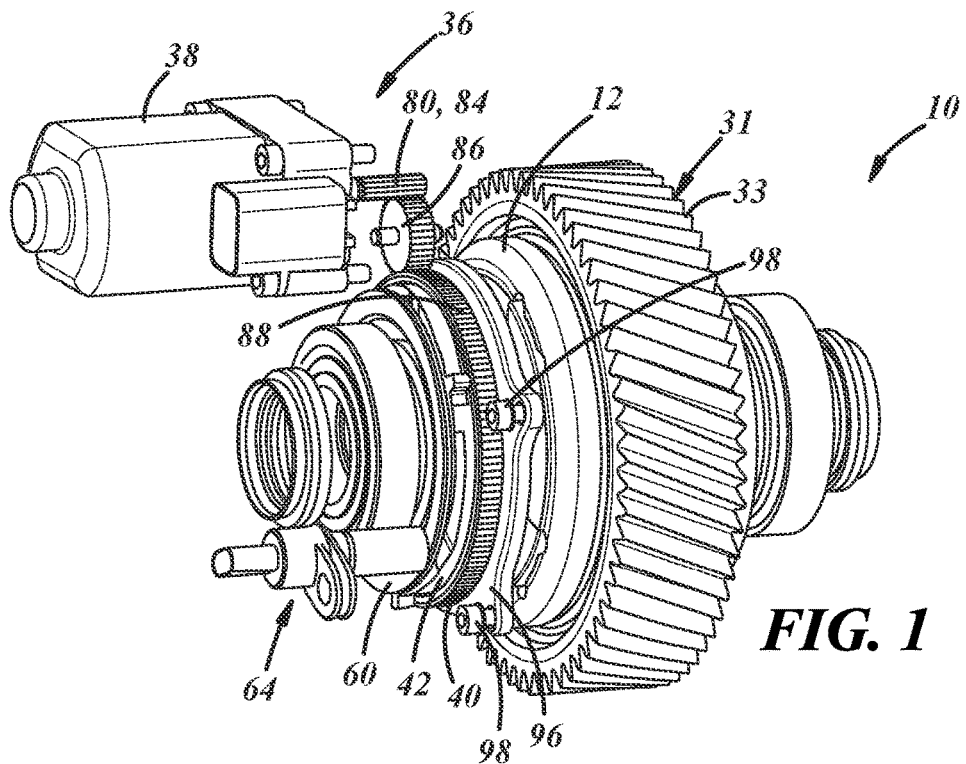
FIG. 1 is a perspective view of a rotary power transmission device including a differential having a clutch that is selectively engaged via an actuator assembly.
FIG. 2 is a cross-sectional view of the device shown in FIG. 1.
Figure 3:
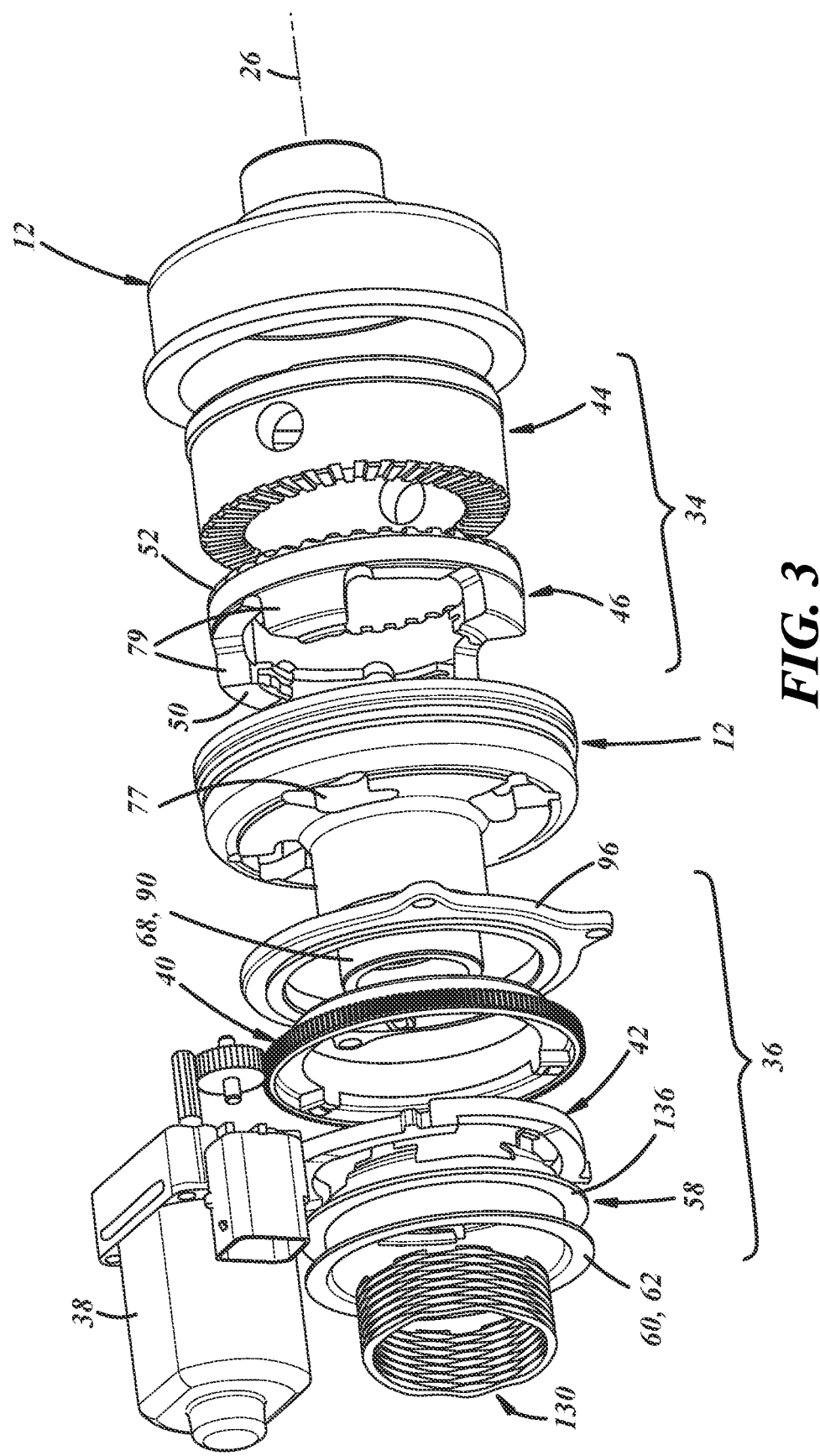
FIG. 3 is an exploded view of certain components of the device shown in FIG. 1.
Figure 6:
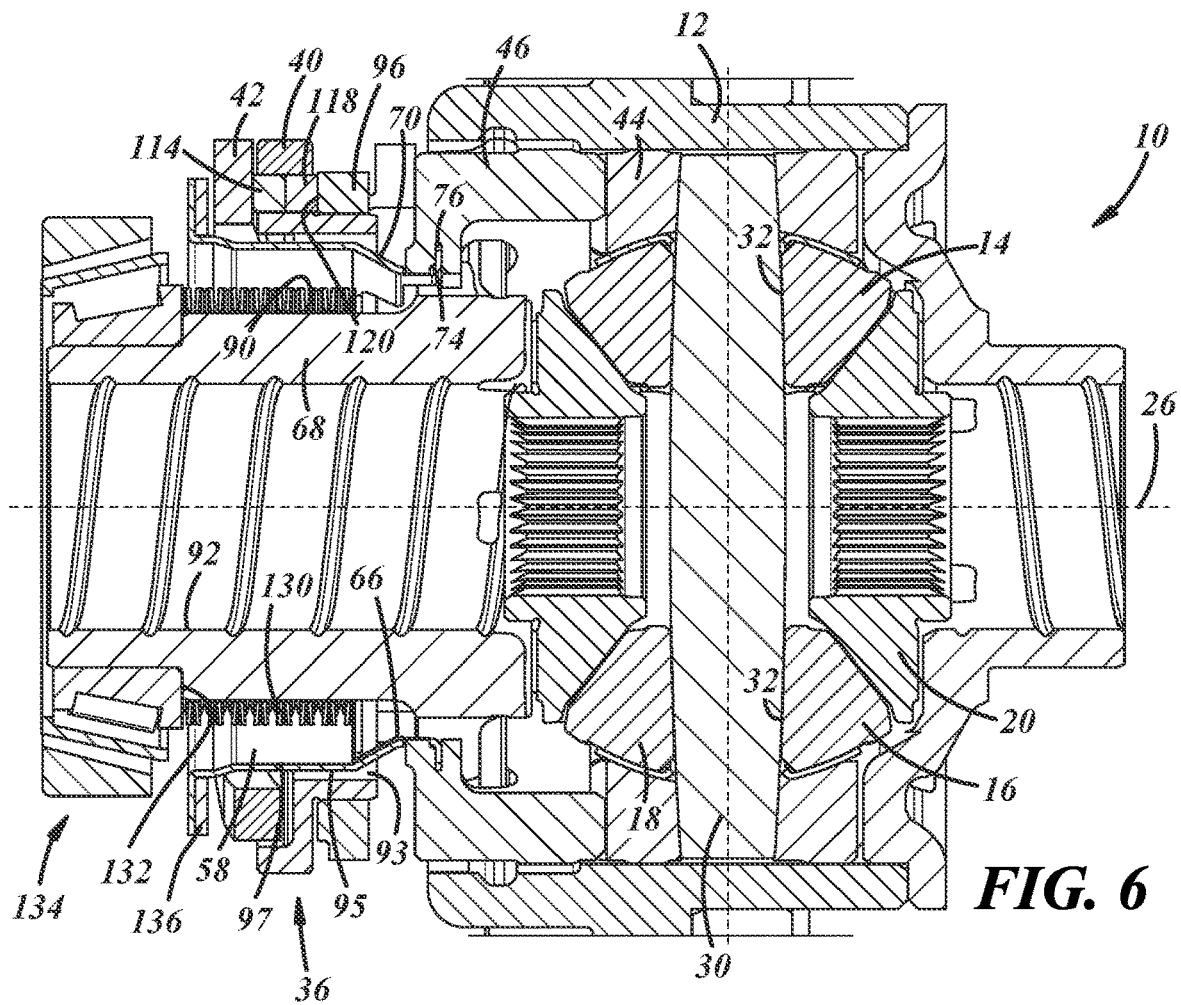
FIG. 6 is a cross-sectional view of part of the device of FIG. 1, showing the clutch in the connected state.
Figure 7:
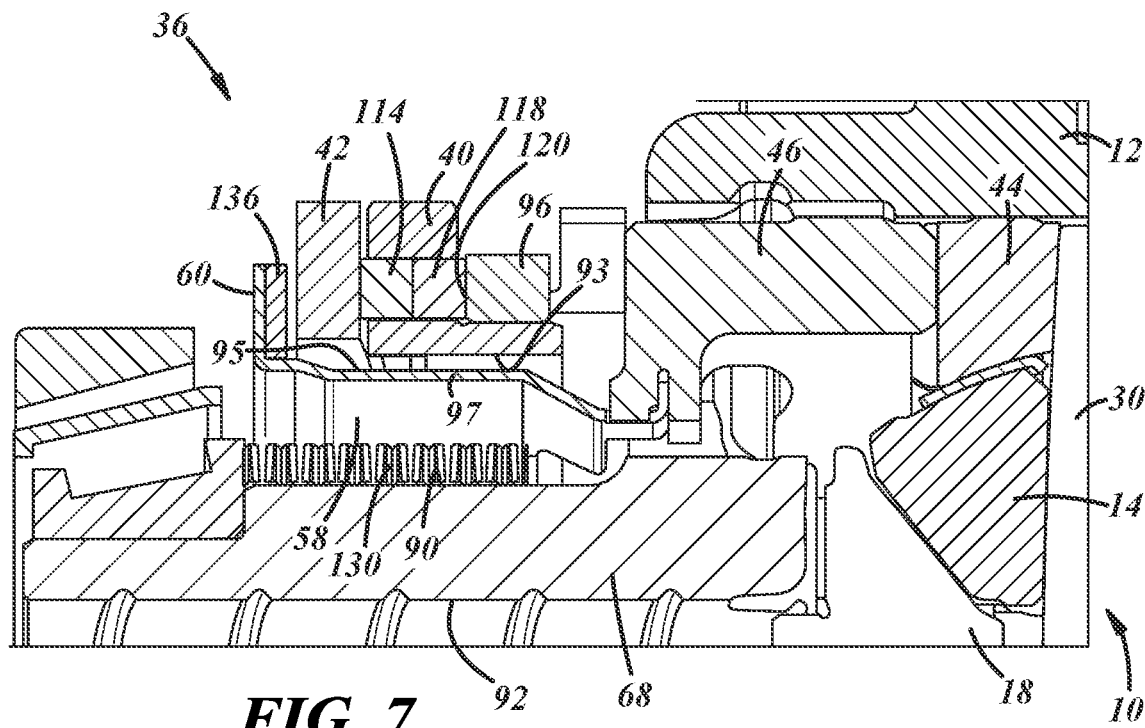
FIG. 7 is a view similar to FIG. 5.

Referring in more detail to the drawings, FIGS. 1 and 2 illustrate a portion of a rotary power transmission device, shown as a differential 10 that may be used in an e-axle (e.g. an e-motor driven final drive unit) or any power transmission system. As shown in FIG. 2, the differential 10 includes an outer housing 12, a pair of pinion gears 14, 16 and a pair of side gears 18, 20 that are arranged to be coupled to rotating shafts 22, 24 that may drive, for example, wheels of a vehicle. Thus, the side gears 18, 20 rotate with the shafts 22, 24 about a shaft axis 26 and as best shown in FIG. 6, the pinion gears 14, 16 are rotatable about an axis 28 defined by a pinion gear shaft 30 extending through openings 32 in the pinion gears. In the implementation shown in FIGS. 1 and 2, an annular gear 31 is fixed to the outer housing 12 for rotation with the outer housing 12. The gear 31 has radially outwardly extending teeth 33 via which torque is transmitted to another component.

The differential 10 also includes a clutch 34 that is driven by an actuator assembly 36. In at least some implementations, the actuator assembly 36 has an electric motor 38, a actuator input member 40 and a actuator output member 42. The motor 38 rotates the actuator input member 40 which drives the actuator output member 42 to change the state of the clutch 34 between disconnected and connected states, as will be discussed in more detail later.

In at least some implementations, the clutch 34 is an engaging clutch such as a dog clutch, and includes a first clutch member 44 that is not movable in an axial direction (defined by the axis 26 of the shafts 22, 24), and a second clutch member 46 that is movable in the axial direction relative to the first clutch member 44.

In at least some implementations, the clutch 34 may be used, for example, in a so-called free running differential 10, that selectively interrupts and permits torque transmission therethrough. In this device, a first rotating body is the outer differential housing 12 and a second rotating body is the first clutch member 44, and the first rotating body and the second rotating body rotate about a common rotational axis 26. In the implementation shown, the first clutch member 44 is coupled to the pinion gear shaft 30, such as by a pin or bolt, and is constrained against axial movement relative to the second Referring to FIGS. 3-7, the second clutch member 46 may be coaxial with the axis 26 of the shafts 22, 24, and may be received outboard of the pinion gears 14, 16 (i.e. farther from the axis 26 than the pinion gears 14, 16). The second clutch member 46 may include a rear face 50 closer to the actuator assembly 36 than a front face 52, with the front face 52 having at least one engagement feature, such as gear or clutch teeth 54 (e.g. dog clutch teeth) configured to engage a corresponding engagement feature (e.g. gear or dog clutch teeth 56) formed on the first clutch member 44.

Figure 4:
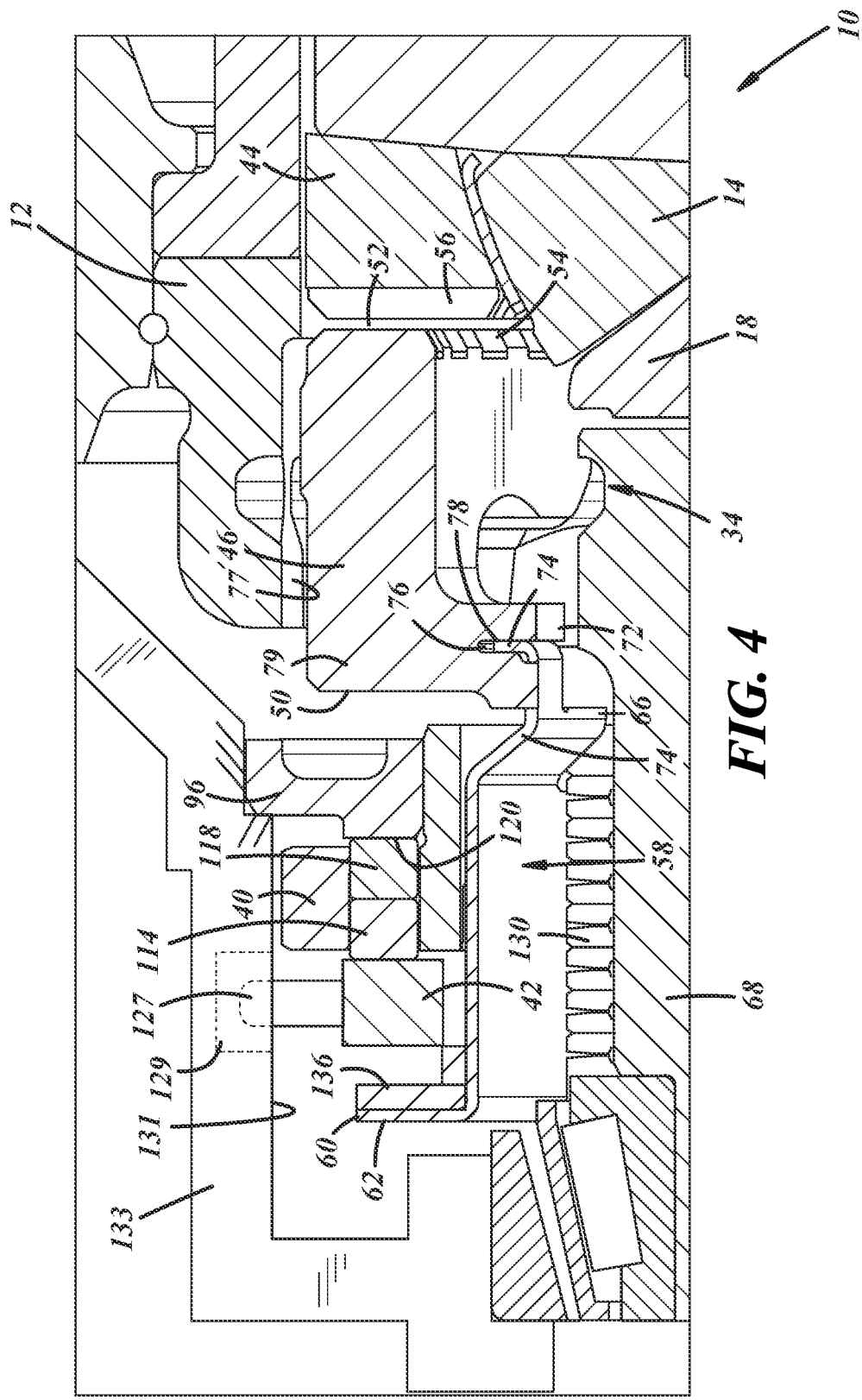
FIG. 4 is a fragmentary sectional view illustrating part of the actuator assembly and clutch, with the clutch shown in a disconnected state.

In at least some implementations, and as shown in FIG. 4 and other figures, the second clutch member 46 may be connected to an actuator sleeve 58 which is coupled to or otherwise moves axially with the actuator output member. The sleeve 58 may provide a surface, such as a radially extending rim 60 at a first end 62 of the sleeve 58, that is detected by a suitable sensor 64 (FIGS. 1 and 2) to enable detection of the position of the second clutch member 46 (and hence, determination of the state of the clutch 34), as desired. In the implementation shown, the sleeve 58 is annular and includes a central opening 66 received over a tubular portion 68 of the outer housing 12 about which the actuator input member 40 and actuator output member 42 are received. To facilitate coupling the sleeve 58 to the second clutch member 46, the sleeve 58 may include one or more axially extending arms 70 that axially overlap and are received radially inwardly of an inner surface 72 of the second clutch member 46. The arms 70 may include radially outwardly extending fingers 74 received in slots 76 formed in the inner surface 72 of the second clutch member 46. In the implementations show, the sleeve 58 includes multiple arms 70 that are circumferentially spaced apart about a second end 78 of the sleeve 58. So arranged, the second clutch member 46 is coupled to and moves with the sleeve 58 in both directions of movement of the second In the implementation shown, the actuator assembly 36 is primarily outside of the housing 12 and not inside the housing with the clutch 34, pinion gears 14, 16 and side gears 18, 20. So that the actuator assembly 36 can actuate the clutch 34 to change the state of the clutch 34, the housing 12 includes openings 77 (labeled in FIGS. 1 and 2) and the second clutch member 46 may include feet 79 in which the slots 76 are formed. The feet 79 extend axially into the openings 77 and the second clutch member 46 is rotatably coupled to the housing 12 and via the coupling to the sleeve 58, permits actuation of the clutch 34 as further described below. Further, the slots 76 in the feet 79 may be oriented in a radially inwardly facing surface 72 of the feet 79, and the fingers 74 may corresponding extend radially outwardly from the arms 70. Further, adjacent to the slots 76 the feet 79 may include radially inwardly extending stop surfaces 83 (FIG. 9) that overlap the arms 70 of the sleeve 58. So arranged, the sleeve 58 can be positioned with each arm 70 adjacent to and between adjacent feet 79 of the second clutch member 46, and then the sleeve 58 can be rotated to insert the fingers 74 into the slots 76, until the arms 70 contact the stop surfaces 83 of the feet 79 to provide a rotating, bayonet style interlock connection between the sleeve 58 and the second clutch member 46, which, in at least some implementations, may be done without any fasteners, adhesive, welding, or other connection. Because the sleeve 58 rotates with the second clutch member 46, the fingers 74 remain in the slots 76, to maintain the sleeve 58 coupled to the second clutch member 46. Further, the radial overlap between the fingers 74 and feet 79 ensures that the sleeve 58 and second clutch member 46 move axially together, as a unit.

Referring again to the actuator assembly 36, the motor 38 may be any suitable type of electric motor including brushed or brushless, and may be a stepper motor, if desired. As shown in FIG. 2, the motor 38 includes an output shaft 80 rotated about an axis 82 and having or including a gear or gear teeth 84 that are meshed with one or more gears to provide desired rotary speed and torque capacity. In the example shown, the output shaft 80 drives a spur gear 86 that is also meshed with a gear or gear teeth 88 on the actuator input member 40 such that rotation of the output shaft 80 causes rotation of the actuator input member 40 via the gear 86. Of course, other arrangements may be used to rotate the actuator input member 40, such as but not limited to a worm gear arrangement or bevel gears. The actuator assembly 36 may be carried by the outer housing 12, such as about an outer surface 90 of the tubular portion 68 having an opening 92 in which one of the shafts 22, 24 is received.

Figure 5:
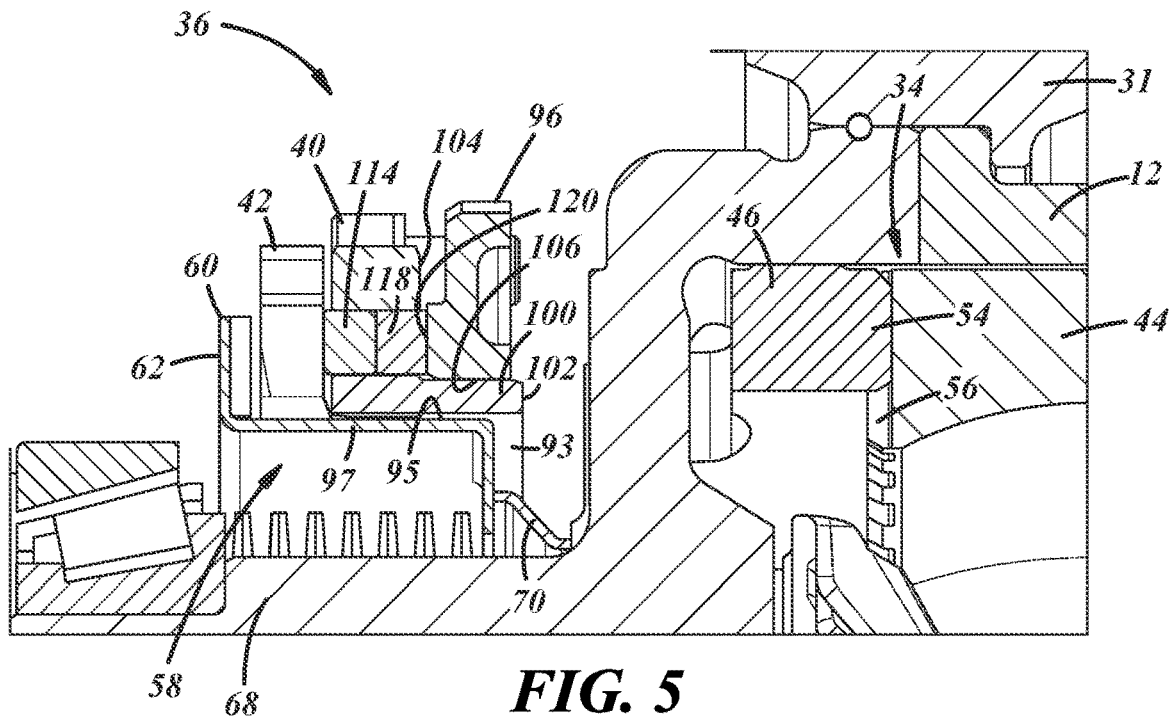
FIG. 5 is a fragmentary sectional view illustrating part of the actuator assembly and clutch, with the clutch shown in a connected state.

As shown in FIGS. 5 and 6, the actuator input member 40 may be annular and coaxially arranged with the clutch 34 and sleeve 58, and have a radially inner surface 93 received over an outer surface 95 of an intermediate portion 97 the sleeve 58 that extends axially from the rim 60 to the second clutch member 46. The actuator input member 40 is rotatable relative to the sleeve 58 and about the axis 26 of the shafts 22, 24. While rotatable, the actuator input member 40 may be fixed or constrained against axial movement, such as by an annular end plate 96 which may be fixed to the outer housing 12 by fasteners 98 (FIG. 1) or otherwise. In at least some implementations, the actuator input member 40 includes a flange 100 that extends axially from a first end 102 of the actuator input member 40 to a radially outwardly extending and annular intermediate surface 104. The intermediate surface 104 may face the end plate 96 and the flange 100 may be received through an opening 106 of the end plate 96. The intermediate surface 104 may extend to the radially outer surface of the actuator input member 40 about which the teeth 88 are provided for driving engagement with the gear 86.

Figure 8:
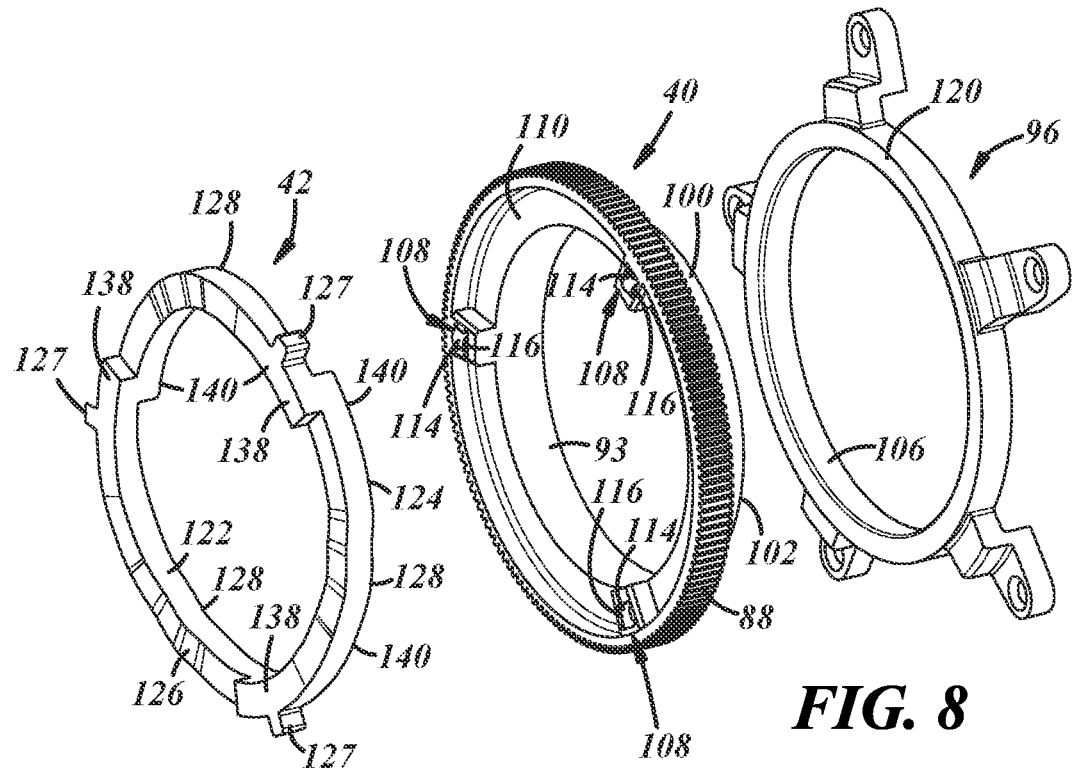
FIG. 8 is an exploded view of part of the actuator assembly including a actuator input member and follower arrangement.
Figure 9:
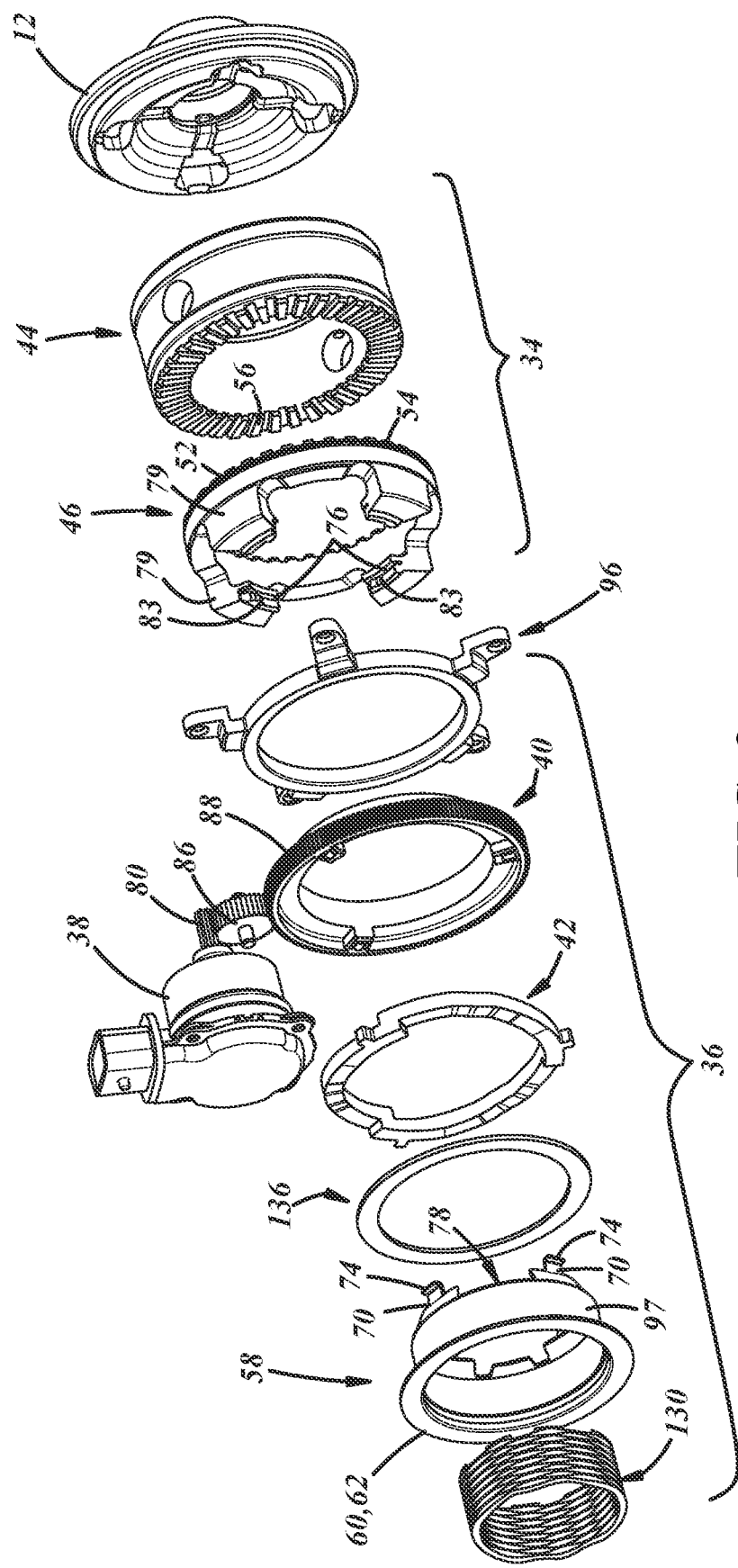
FIG. 9 is an exploded view similar to FIG. 3.

To axially drive the actuator output member 42, as shown in FIG. 8, the actuator input member 40 includes one or more drive surfaces 108 which may be formed in or carried by a radially extending surface 110 of the actuator input member 40 at or near a second end 112 of the actuator input member, and facing and arranged to be contacted by the actuator output member 42. As best shown in FIGS. 8 and 9, the drive surfaces 108 are defined by rollers 114 received in pockets 116 of the input member 40 such that the rollers 114 may rotate relative to the input member 40 as the input member 40 rotates relative to the output member 42, to reduce friction between the input member 40 and output member 42. In at least some implementations, multiple rollers 114 are circumferentially spaced apart about the surface 110, and outer surfaces of the rollers 114 may be at the same axial extent (e.g. an imaginary plane perpendicular to the axis 26 may be drawn tangent to the outer surface of all rollers 114). This may facilitate a uniform engagement with the output member 42 to limit or avoid canting or tilting of the output member 42 relative to the input member 40. As best shown in FIGS. 4-7, similar located and arranged rollers 118 may be provided protruding from the intermediate surface 104 and arranged to contact an end face 120 of the end plate 96 to reduce friction as the input member 40 rotates relative to the end plate 96.

In at least some implementations, the output member 42 is annular and coaxially arranged with the input member 40, and has a radially inner surface 122 arranged over the outer surface 95 of the sleeve 58. The output member 42 includes a first end face 124 adjacent to input member 40 and an opposite, second end face 126 with the inner surface 122 extending between the end faces 124, 126. To prevent the output member 42 from rotating with the input member 40, the output member 42 is constrained against rotation. In the example shown, the output member 42 includes outwardly extending tabs 127 that are received within axially extending slots 129 (labeled in FIG. 4) formed in an inner surface 131 of a cover our secondary housing 133 that overlies the output member 42, as diagrammatically shown in FIG. 4. Alternatively, the output member 42 could include radially inwardly extending tabs received within axially extending slots in the sleeve 58, or be constrained against rotation in any other desired manner.

So that the output member 42 moves axially in response to rotation of the input member 40 by the motor 38, the output member 42 includes, as labeled in FIG. 8, axially inclined cam surfaces 128 that are contacted by the rollers 114 (or other engagement surface or feature of the input member 40 if rollers 114 are not provided). The cam surfaces 128 are maintained in contact with the rollers 40 by the force of a spring 130 that yieldably biases the output member 42 into engagement with the input member 40. As shown in FIG. 6 among other figures, the spring 130 may be arranged between the sleeve 58 and a stop surface 132 defined by the housing 12 or a component coupled to the housing 12, such as a roller bearing assembly 134. So arranged, the spring 130 urges the sleeve rim 60 into engagement with the second end face 126 of the output member 42 which, in turn, urges the output member 42 into engagement with the input member 40. Or, the spring 130 could be arranged directly between the sleeve rim 60 and the output member 42.

To reduce friction between the sleeve rim 60 and output member 42, an annular disc bearing 136 may be provided between them, and/or the second end face 126 of the output member 42 may be axially variable so that a limited surface area of the output member 42 is engaged with the bearing 136 or sleeve rim 60. In the implementations shown, the second end face 126 includes multiple contact surfaces 138 (FIG. 8) that define the axially outermost portion of the end face 126 and which may be circumferentially spaced apart to ensure even loading or forces on the output member 42 to inhibit or prevent tilting thereof. If desired, a similar number of contact surfaces 138 may be provided as cam surfaces 128.

When the motor 38 rotates the input member 40 relative to the output member 42 in a first direction, the rollers move along the cam surfaces 128 and the output member 42 is axially displaced toward the first clutch member 44. In this direction of movement, the spring 130 assists movement of the sleeve 58 and second clutch member 46 toward and into meshing contact with the first clutch member 44 to put the clutch 34 in the connected state. In this connected state of the clutch 34, the first clutch member 44 is coupled to and rotates with the outer housing 12 and torque is transmitted to the shafts 22, 24. When the motor 38 rotates the input member 40 relative to the output member 42 in a second direction, the rollers move along the cam surfaces 128 and the output member 42 is axially displaced away from the first clutch member 44. In this direction of movement, the output member 42 is moved against the force of the spring 130 and the spring is compressed as the output member 42 moves the sleeve 58 and second clutch member 36 away from the first clutch member 44 to put the clutch 34 in the disconnected state. In the disconnected state of the clutch 34, the shafts/axles 22, 24 are not actively driven and may rotate relative to the second clutch member 46 and outer housing 12.

In both the connected state and the disconnected state of the clutch 34 it may be desirable to be able to cease the supply of electricity to the motor 38 yet maintain the position of the then current state of the clutch (i.e. either engaged or disengaged). In at least some implementations, this is accomplished by providing non-driving surfaces which may include flat surfaces 140 at circumferentially opposite ends of the cam surfaces 128. The flat surfaces 140 are oriented perpendicular to the axis 26 and so the force of the spring 130 acts normal (i.e. perpendicular) to the flat surfaces 140 and thus, does not tend to back drive/rotate the input member 40 and the rollers 114 remain engaged with the flat surfaces. If desired, the non-driving surfaces may be defined by or include detents in or instead of the flat surfaces, and the rollers may be received in the detents or along a surface having a slope counter to the adjacent cam surface 128 in either or both positions of actuator assembly 36 that correspond to the states of the clutch 34 to further resist movement of the assembly when the motor is not energized/powered. In this way, the actuator assembly 36 can be maintained in both positions and the clutch 34 can be maintained in the corresponding connected and disconnected states without power being provided to the motor 38.

In at least some implementations, the actuator assembly includes a spring 130 that is radially inwardly located and radially and axially overlapped by the input member 40, output member 42 and the sleeve 58. The sleeve 58 over which the input member 40 and output member 42 are mounted, is also radially and axially overlapped by the input member 40 and output member 42, as well as the end plate 96 in at least some implementations. Further, in at least some implementations, a roller bearing 134 of the differential 10 may be overlapped by at least the sleeve 58 in at least one position of the sleeve, as shown in FIG. 4. In at least some implementations, the bearing assembly 134 may be further overlapped by the sleeve and actuator assembly 36 generally, as desired to provide an even more axially compact arrangement.

While described with reference to a differential having a dog clutch that permits selective connection and torque transfer, the actuator assembly may be used in many other devices including devices including friction couplings, with locking differentials, and with power transfer unit (PTU) disconnect assemblies, by way of examples without limitation.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. An actuator and clutch assembly for a power transmission device, comprising:
   a first clutch member;
   a second clutch member movable relative to and selectively drivingly engageable with the first clutch member to define a connected state of the clutch when the second clutch member is drivingly engaged with the first clutch member and a disconnected state of the clutch when the second clutch member is not drivingly engaged with the first clutch member;
   an electric motor;
   an input member driven for rotation about an axis by the motor;
   an output member driven axially relative to the input member when the input member rotates, wherein the second clutch member moves axially with the output member; and
   a spring providing a force on the output member that biases the output member in a direction in which the second clutch member is moved toward the first clutch member, wherein the spring is radially and axially overlapped by the input member and the output member.

2. The assembly of claim 1, which also comprises an actuator sleeve that is engaged by the spring and biased into engagement with the output member, the actuator sleeve being coupled to the second clutch member so that the actuator sleeve and second clutch member move together and not relative to each other.

3. The assembly of claim 2 wherein the actuator sleeve radially and axially overlaps at least part of the spring, and wherein the input member and output member radially and axially overlap at least part of the sleeve.

4. The assembly of claim 3 wherein the input member includes a radially outer surface, an intermediate surface that is radially inward of the radially outer surface, and a radially inner surface that is radially inward of the intermediate surface, and wherein at least part of the actuator sleeve is received radially inward of the radially inner surface.

5. The assembly of claim 3 wherein the spring provides a force on the actuator sleeve, and movement of the output member in one axial direction moves the sleeve against the force of the spring.

6. The assembly of claim 3 wherein the input member is annular, the output member is annular and the actuator sleeve extends through the input member and the output member.

7. The assembly of claim 2 wherein the actuator sleeve is coupled to the second clutch member by one or more fingers received in slots formed in the second clutch member, where the one or more fingers and slots are oriented radially.

8. The assembly of claim 2 wherein the actuator sleeve includes a radially extending rim at a location spaced from the second clutch member, and the output member is located between the input member and the rim.

9. The assembly of claim 1 wherein the output member includes a cam surface that is inclined relative to the axis and is engaged by the input member so that the output member is driven axially during rotation of the input member.

10. The assembly of claim 9 wherein the output member includes a non-driving surface at a circumferential end of the cam surface, where the non-driving surface is defined by one or both of a detent or a flat surface that is perpendicular to the axis and is arranged to retain an axial position of the output member.

11. The assembly of claim 1 wherein the output member includes multiple cam surfaces that are circumferentially spaced apart and are inclined relative to the axis, the cam surfaces are engaged by the input member so that the output member is driven axially during rotation of the input member, and wherein the output member includes multiple non-driving surfaces between adjacent ones of the cam surfaces, with the non-driving surfaces arranged to retain an axial position of the output member.

12. The assembly of claim 1 wherein the input member includes gear teeth provided on a radially outer surface of the input member, the motor rotates a gear that is meshed with the gear teeth, and wherein the spring is located radially inward of the input member.

13. The assembly of claim 12 wherein the output member includes a cam surface that is inclined relative to the axis and is engaged by the input member so that the output member is driven axially during rotation of the input member, and wherein the cam surface is located radially inwardly of the gear teeth.

14. A rotary power transmission device, comprising:
a housing having a tubular portion with a central axis;
a clutch carried by the housing and having a first clutch member and a second clutch member that is movable relative to and selectively engageable with the first clutch member;
an electric motor;
an input member driven for rotation about the central axis by the motor, the input member being located radially outwardly of the tubular portion;
an output member driven axially relative to the input member when the input member rotates;
an actuator sleeve that is coupled to the second clutch member, has an intermediate portion received radially between the tubular portion and the input member, and has a radially extending rim that radially overlaps the output member; and
a spring received at least partially between the actuator sleeve and the tubular portion, the spring providing a force on the actuator sleeve that biases both the sleeve and the output member in a first axial direction in which the second clutch member is moved toward the first clutch member, wherein the spring is radially and axially overlapped by the input member and the output member.

15. The device of claim 14 wherein the first axial direction is a direction in which the second clutch member is engaged with the first clutch member, and wherein the electric motor rotates the input member in a first direction to axially drive the output member and sleeve in a second axial direction that is opposite to the first axial direction.

16. The device of claim 14 wherein the output member includes multiple cam surfaces that are circumferentially spaced apart and are inclined relative to the axis, the cam surfaces are engaged by the input member so that the output member is driven axially during rotation of the input member, and wherein the output member includes multiple non-driving surfaces between adjacent ones of the cam surfaces, with the non-driving surfaces arranged to retain an axial position of the output member.

17. The device of claim 14 wherein the output member is located axially between the rim and the input member.

18. The device of claim 14 which includes a bearing carried by the tubular portion and wherein a first end of the spring engages the bearing and a second end of the spring engages the actuator sleeve.

* * * * *